(12) United States Patent
Takata et al.

(10) Patent No.: US 11,422,452 B2
(45) Date of Patent: Aug. 23, 2022

(54) OPTICAL MULTIPLEXER AND IMAGE PROJECTION APPARATUS USING THE SAME

(71) Applicant: Panasonic Intellectual Property Management Co., Ltd., Osaka (JP)

(72) Inventors: Kazumasa Takata, Osaka (JP); Takashi Matsuda, Hyogo (JP); Atsushi Fukui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 30 days.

(21) Appl. No.: 17/016,556

(22) Filed: Sep. 10, 2020

(65) Prior Publication Data
US 2021/0103208 A1    Apr. 8, 2021

(30) Foreign Application Priority Data
Oct. 7, 2019    (JP) .............................. JP2019-184783

(51) Int. Cl.
*G03B 21/20*    (2006.01)
*G02B 27/42*    (2006.01)
(Continued)

(52) U.S. Cl.
CPC ......... *G03B 21/208* (2013.01); *G02B 26/101* (2013.01); *G02B 27/425* (2013.01);
(Continued)

(58) Field of Classification Search
CPC .............. G02B 27/1086; G02B 26/101; G02B 27/0101; G02B 27/0172; G02B 27/102;
(Continued)

(56) References Cited

U.S. PATENT DOCUMENTS

| 8,403,491 B2 | 3/2013 | Iyoda et al. | |
| 2003/0063385 A1* | 4/2003 | Takushima | G02B 6/29395 359/566 |

(Continued)

FOREIGN PATENT DOCUMENTS

| JP | 2006-184782 | 7/2006 |
| JP | 2010-243986 | 10/2010 |

(Continued)

*Primary Examiner* — Magda Cruz
(74) *Attorney, Agent, or Firm* — Wenderoth, Lind & Ponack, L.L.P.

(57) ABSTRACT

An optical multiplexer includes: an incident surface on which incident light beams having different wavelengths are to be incident; a reflection portion configured to reflect the incident light beams; and an emission surface configured to emit reflected light beams reflected by the reflection portion. The incident surface has adjacent condenser lenses corresponding to the respective incident light beams. The reflection portion has adjacent reflection surfaces configured to reflect the respective incident light beams which have been condensed. The adjacent reflection surfaces are respectively disposed so that angle β formed by the respective reflected light beams reflected by the adjacent reflection surfaces is smaller than angle α formed by the respective incident light beams which have been condensed. The emission surface has diffraction grating in which the respective reflected light beams reflected by the adjacent reflection surfaces are to be incident at a same position and diffracted in a same direction.

9 Claims, 7 Drawing Sheets

(51) Int. Cl.
*H04N 9/31* (2006.01)
*G02B 26/10* (2006.01)

(52) U.S. Cl.
CPC ..... *G03B 21/2013* (2013.01); *G03B 21/2066* (2013.01); *H04N 9/3135* (2013.01)

(58) Field of Classification Search
CPC .. G02B 27/104; G02B 27/425; G03B 21/208; G03B 21/20; G03B 21/2013; G03B 21/2033; G03B 21/2066; H04N 9/3164; H04N 9/3135
See application file for complete search history.

(56) References Cited

U.S. PATENT DOCUMENTS

| | | | | |
|---|---|---|---|---|
| 2005/0276538 | A1* | 12/2005 | Takushima | G02B 6/29395 385/24 |
| 2006/0198576 | A1* | 9/2006 | Furusawa | G02B 6/32 385/47 |
| 2007/0098324 | A1* | 5/2007 | Kitamura | G02B 5/1861 385/37 |
| 2009/0103923 | A1* | 4/2009 | Hosomi | G02B 6/4215 398/91 |
| 2009/0135488 | A1* | 5/2009 | Aota | G02B 27/42 359/569 |
| 2010/0259729 | A1* | 10/2010 | Iyoda | G02B 27/104 353/31 |
| 2013/0292571 | A1* | 11/2013 | Mukherjee | G01J 3/108 250/339.11 |
| 2017/0139143 | A1* | 5/2017 | Sugama | G02B 6/4215 |

FOREIGN PATENT DOCUMENTS

| | | |
|---|---|---|
| JP | 2010-243987 | 10/2010 |
| JP | 2013-065002 | 4/2013 |

* cited by examiner

OPTICAL MULTIPLEXER AND IMAGE PROJECTION APPARATUS USING THE SAME

BACKGROUND

1. Technical Field

The disclosure relates to an optical multiplexer that multiplexes and emits a plurality of incident light beams having different wavelengths, and an image projection apparatus using the same.

2. Description of the Related Art

There is known an optical multiplexer that multiplexes light beams having different wavelengths into one light beam by using a dichroic mirror capable of controlling reflection and transmission for each wavelength.

The optical multiplexer using the dichroic mirror can multiplex light beams having different wavelengths with high optical efficiency, but has a problem that a multilayer optical thin film is required and the cost becomes high.

Figure 9:
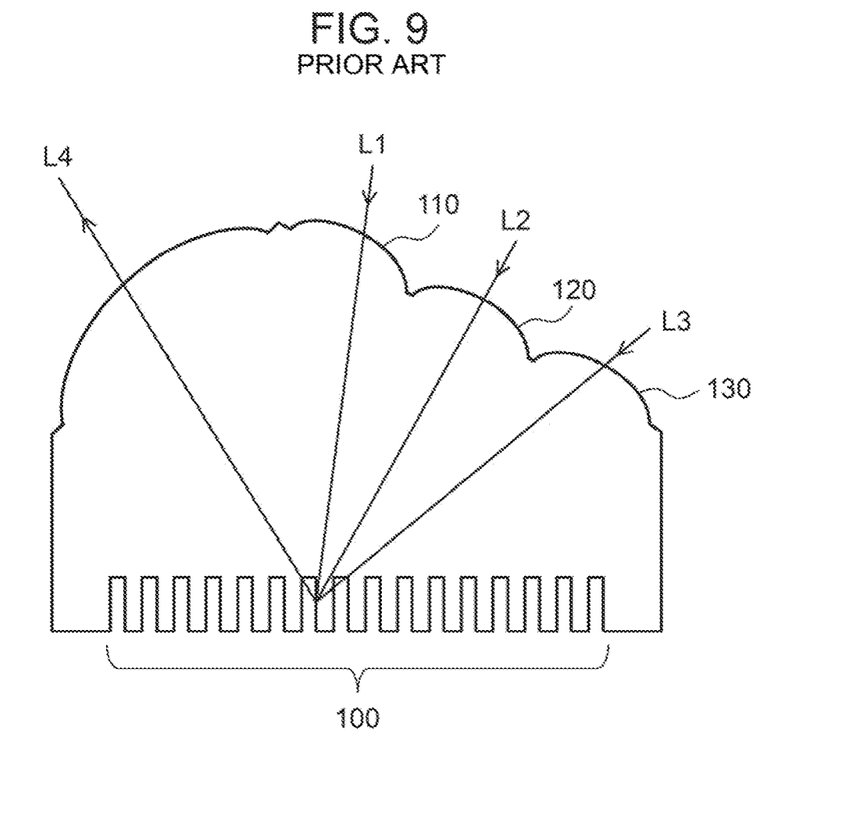
FIG. 9 is a view illustrating a configuration of an optical multiplexer of the related art.

Japanese Patent Unexamined Publication No. 2010-243987 discloses an optical multiplexer using a diffraction grating. As illustrated in FIG. 9, the optical multiplexer disclosed in Japanese Patent Unexamined Publication No. 2010-243987 is made of a resin in which diffraction grating 100 and collimator lenses 110, 120, and 130 are integrated. Light beams L1, L2, and, L3 having different wavelengths are respectively collimated by collimator lenses 110, 120, and 130, and diffracted and reflected by diffraction grating 100. Light beams L1, L2, and L3 are incident at a same position of diffraction grating 100 and incident angles of light beams L1, L2, and L3 on diffraction grating 100 are set so that reflected light beams of the respective light beams have same optical path L4.

SUMMARY

An optical multiplexer according to the disclosure is an optical multiplexer that multiplexes a plurality of incident light beams having different wavelengths into a light beam and emits the light beam, the optical multiplexer including: an incident surface on which the plurality of incident light beams are incident; a first reflection portion that reflects the plurality of incident light beams incident on the incident surface; and an emission surface that emits, to an outside, a plurality of reflected light beams reflected by the first reflection portion.

The incident surface is provided with a plurality of adjacent condenser lenses corresponding to the plurality of incident light beams. The first reflection portion has a plurality of adjacent reflection surfaces that respectively reflect light beams condensed by the plurality of adjacent condenser lenses. Each of the plurality of reflection surfaces is disposed so that an angle formed by a reflected light beams reflected by a corresponding one of the plurality of adjacent reflection surfaces among the plurality of reflected light beams is smaller than an angle formed by an incident light beam condensed by a corresponding one of the plurality of adjacent condenser lenses among the plurality of incident light beams. The emission surface is provided with a transmission type diffraction grating in which the plurality of reflected light beams reflected by the plurality of adjacent reflection surfaces are incident at a same position and diffracted in a same direction.

DETAILED DESCRIPTION

In the optical multiplexer disclosed in Japanese Patent Unexamined Publication No. 2010-243987, diffraction grating 100 and collimator lenses 110, 120, and 130 can be integrally manufactured by resin molding, so that the cost can be reduced.

However, if light sources of light beams L1, L2, and L3 having different wavelengths are disposed to be physically separated from each other, a diffraction angle of the light beam of each wavelength in diffraction grating 100 becomes large, so that a diffraction efficiency is significantly reduced. This is because a high diffraction efficiency can be optimized for a light beam of one wavelength, but the diffraction efficiency decreases for light beams of wavelengths other than the optimized wavelength. In particular, when the diffraction angle is increased, the diffraction efficiency is significantly decreased with respect to light beams of wavelengths other than the optimized wavelength.

On the other hand, when the diffraction angle in diffraction grating 100 is decreased, the diffraction efficiency increases, but the diffraction angles of the light beams of the respective wavelengths are close to each other. Therefore, in order to separate the light sources of light beams of respective wavelengths from each other, it is necessary to lengthen a length of an optical path from the light sources of the respective wavelengths to diffraction grating 100. As a result, since it is necessary to dispose the light sources of the respective wavelengths at positions far away from diffraction grating 100, there is a problem that the optical system including the light sources becomes large.

The disclosure has been made in view of the above points, and a main object of the disclosure is to provide an optical multiplexer which has a high diffraction efficiency and in which a size of an optical system including light sources can be reduced.

Hereinafter, embodiments of the disclosure will be described in detail with reference to the drawings. The disclosure is not limited to the embodiments below. Appropriate changes can be made without departing from the scope in which the effect of the disclosure is achieved.

Figure 1:
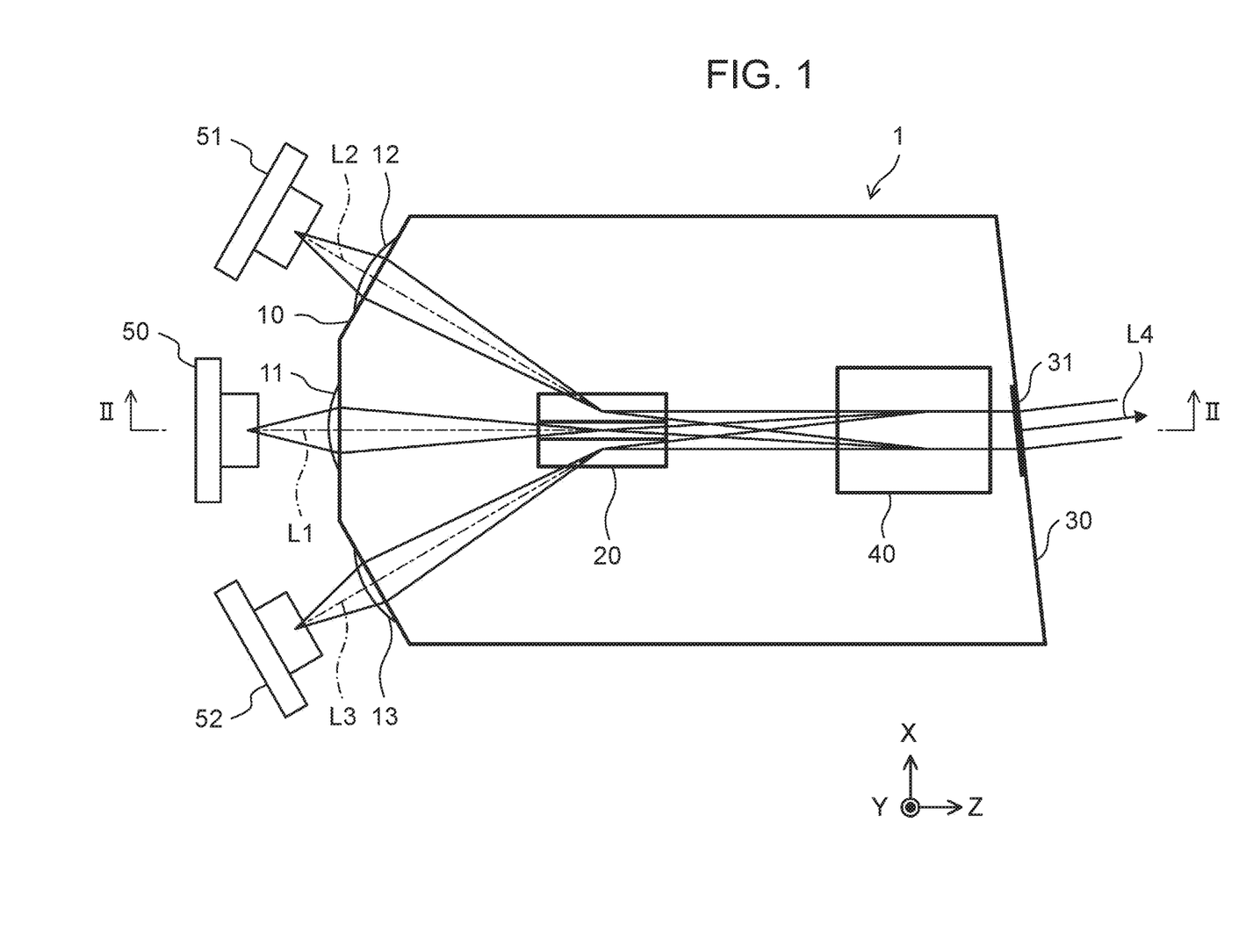
FIG. 1 is a plan view schematically illustrating a configuration of an optical multiplexer according to an embodiment of the disclosure.
Figure 2:
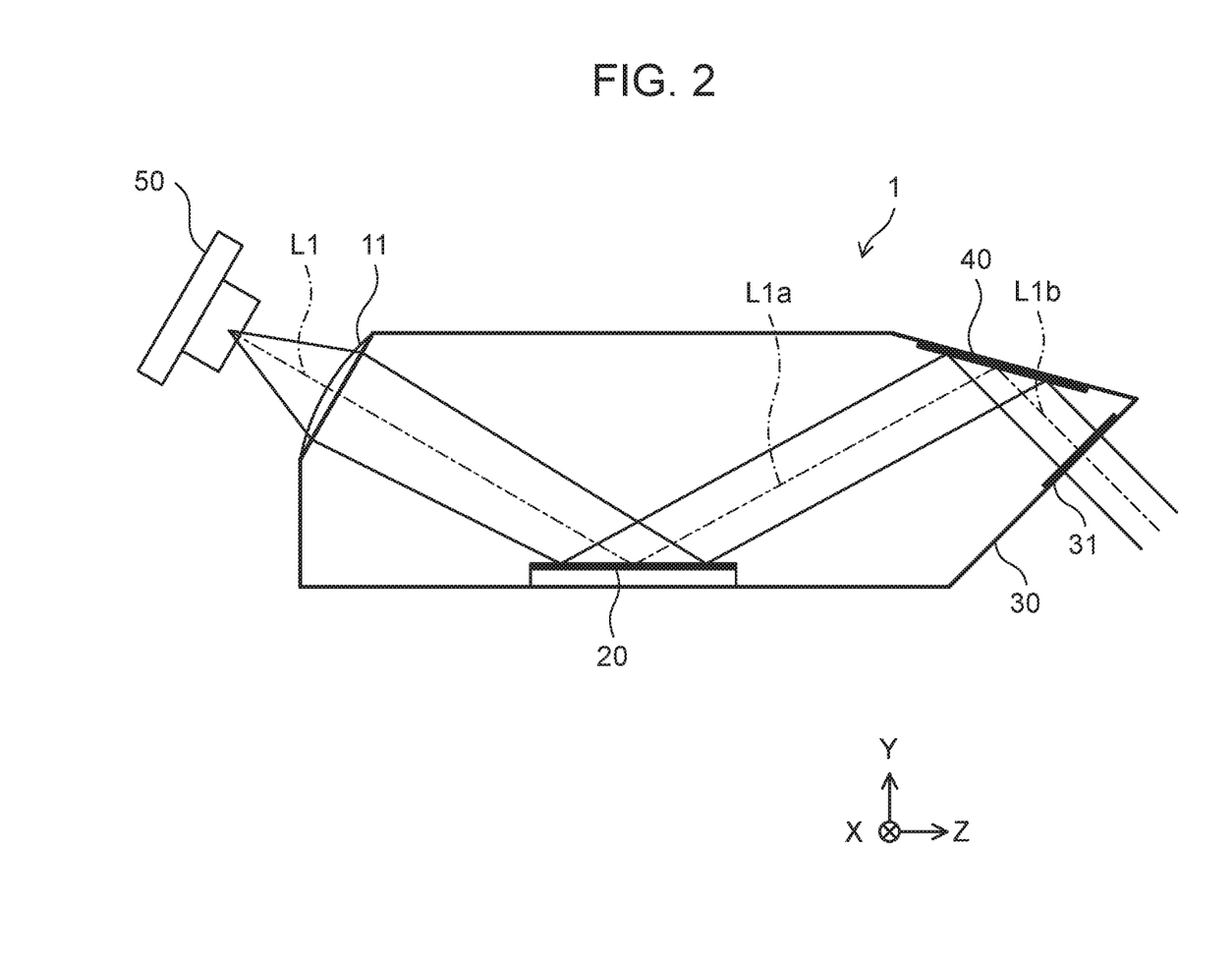
FIG. 2 is a sectional view taken along line II-II in FIG. 1.

FIG. 1 is a plan view schematically illustrating a configuration of an optical multiplexer in an embodiment of the disclosure. FIG. 2 is a sectional view taken along line II-II in FIG. 1. In FIG. 1, a vertical direction of a paper surface is an X-axis, a depth direction of the paper surface is a Y-axis, and a horizontal direction of the paper surface is a Z-axis.

As illustrated in FIGS. 1 and 2, optical multiplexer 1 according to the present embodiment includes incident surface 10, first reflection portion 20, second reflection portion 40, and emission surface 30, each of which is formed on a surface of a same transparent member. The same transparent member is made of, for example, acrylic, polycarbonate, glass, or the like.

A plurality of incident light beams having different wavelengths are incident on incident surface 10. The plurality of incident light beams incident on incident surface 10 are reflected by first reflection portion 20. A plurality of reflected light beams reflected by first reflection portion 20 are collimated and reflected by second reflection portion 40. A plurality of parallel light beams reflected by second reflection portion 40 are multiplexed by diffraction grating 31 provided on emission surface 30 and emitted from emission surface 30 to an outside. For example, in a case where light beams having wavelengths of three primary colors of a light beam of red, green, and blue are used as a plurality of incident light beams having different wavelengths, a white light beam obtained by multiplexing light beams having three wavelengths is emitted from emission surface 30.

Hereinafter, each component of optical multiplexer 1 will be described in detail.

As illustrated in FIGS. 1 and 2, light sources 50, 51, and 52 for emitting light beams L1, L2, and L3 having different wavelengths are disposed at positions facing optical multiplexer 1. Light sources 50, 51, and 52 are, for example, formed of semiconductor lasers.

Light beams L1, L2, and L3 emitted from light sources 50, 51, and 52 are incident on incident surface 10. On incident surface 10, a plurality of condenser lenses 11, 12, and 13 corresponding to respective incident light beams L1, L2, and L3 are provided adjacent to each other. Light beams L1, L2, and L3 condensed by condenser lenses 11, 12, and 13 are incident on first reflection portion 20.

Figure 3A:
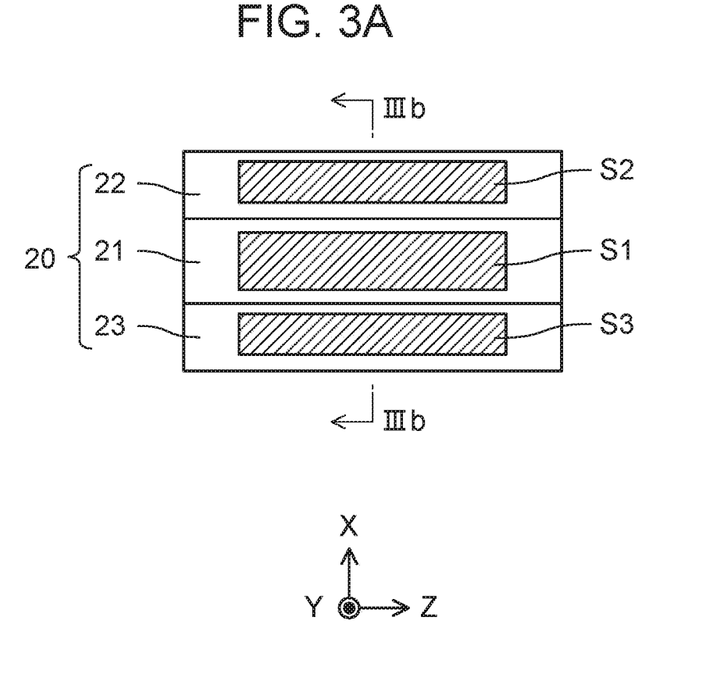
FIG. 3A is a plan view of a first reflection portion.
Figure 3B:
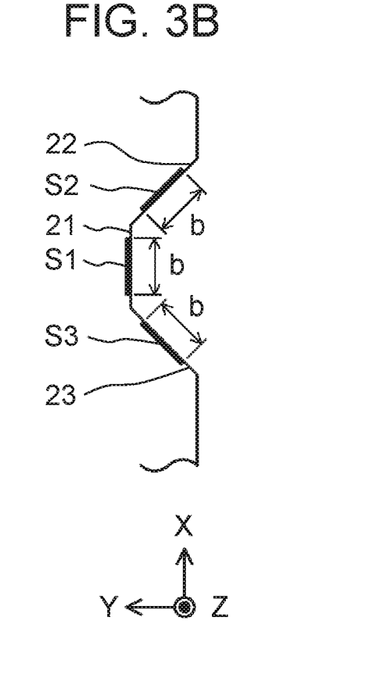
FIG. 3B is a sectional view taken along line IIIb-IIIb in FIG. 3A.

FIG. 3A is a plan view of first reflection portion 20, and FIG. 3B is a sectional view taken along line IIIb-IIIb in FIG. 3A.

As illustrated in FIGS. 3A and 3B, first reflection portion 20 includes a plurality of adjacent reflection surfaces (first reflection surface 21, second reflection surface 22, and third reflection surface 23 adjacent to the first reflection surface) that respectively reflect the light beams condensed by condenser lenses 11, 12, and 13.

In the present embodiment, as illustrated in FIG. 3B, first reflection surface 21 is formed in an XZ plane, and second reflection surface 22 and third reflection surface 23 are respectively disposed to be inclined with respect to first reflection surface 21 in directions inclined to each other. First reflection portion 20 is formed at a position recessed from a bottom of optical multiplexer 1.

Condenser lenses 11, 12, and 13 are lenses having different curvatures in orthogonal directions, and have, for example, an anamorphic shape. Light beams L1, L2, and L3 incident on condenser lenses 11, 12, and 13 are separately condensed in the XZ plane and a YZ plane, respectively. Therefore, as illustrated in FIGS. 3A and 3B, light beams L1, L2, and L3 are condensed in a line shape with width b in the vicinity of centers of respective reflection surfaces 21, 22, and 23. As illustrated in FIG. 2, light beam L1 is incident on reflection surface 21 in a state close to a parallel light beam in the YZ plane. Similarly, light beams L2 and L3 are respectively incident on reflection surfaces 22 and 23 in a state close to a parallel light beam in the YZ plane.

Incident angles of incident light beams L1, L2, and L3 on respective reflection surfaces 21, 22, and 23 are set to be larger than a critical angle of total reflection. For example, in a case where optical multiplexer 1 is made of polycarbonate (having a refractive index of approximately 1.59), the critical angle of the total reflection is approximately 39°.

Figure 4:
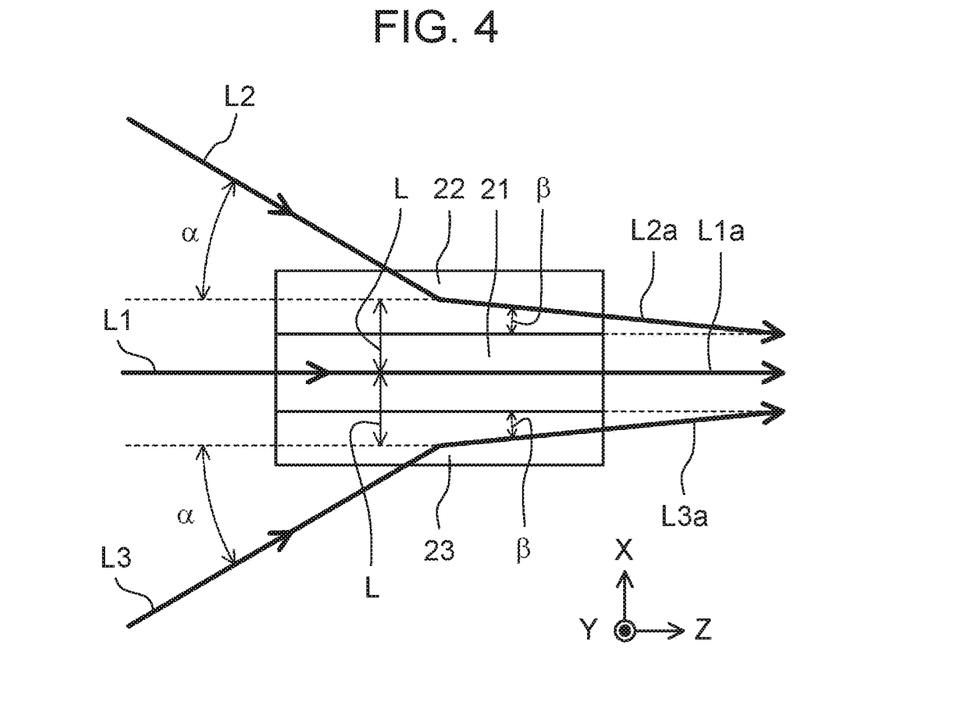
FIG. 4 is a view illustrating a relationship between an incident light beam that incident on the first reflection portion and a reflected light beam that is totally reflected by the first reflection portion.

FIG. 4 is a view illustrating a relationship between incident light beams L1, L2, and L3 incident on reflection surfaces 21, 22, and 23 and reflected light beams L1a, L2a, and L3a totally reflected by reflection surfaces 21, 22, and 23.

As illustrated in FIG. 4, light beam L1 incident on first reflection surface 21 in parallel with the Z-axis is reflected as reflected light beam L1a in parallel with the Z-axis. On the other hand, since second reflection surface 22 is inclined with respect to first reflection surface 21, light beam L2 incident at angle α with respect to the Z-axis is reflected as reflected light beam L2a at angle β smaller than angle α with respect to the Z-axis. Similarly, since third reflection surface 23 is also inclined with respect to first reflection surface 21, light beam L3 incident at angle α with respect to the Z-axis is reflected as reflected light beam L3a at angle β smaller than angle α with respect to the Z-axis.

That is, a plurality of reflection surfaces 21, 22, and 23 are disposed so that angle β formed by reflected light beams L1a and L2a (L1a and L3a) reflected by adjacent reflection surfaces 21 and 22 (21 and 23) is smaller than angle α formed by incident light beams L1 and L2 (L1 and L3) condensed by adjacent condenser lenses 11 and 12 (11 and 13).

As described above, in the present embodiment, first reflection portion 20 formed of the plurality of reflection surfaces 21, 22, and 23 has a light ray angle converting function. Therefore, as illustrated in FIG. 1, even if light sources 50, 51, and 52 of light beams L1, L2, and L3 having different wavelengths are disposed at positions physically separated to each other in the vicinity of optical multiplexer 1, incident light beams L1, L2, and L3 having large angles formed with each other can be converted into reflected light beams L1a, L2a, and L3a having small angles formed with each other. As described later, since reflected light beams L1a, L2a, and L3a are incident on the diffraction grating, diffraction angles of reflected light beams L1a, L2a, and L3a in the diffraction grating can be decreased. As a result, it is possible to realize optical multiplexer 1 having high diffraction efficiency.

Even if light sources 50, 51, and 52 of light beams L1, L2, and L3 having different wavelengths are disposed in the vicinity of optical multiplexer 1, it is possible to realize optical multiplexer 1 having high diffraction efficiency. Therefore, a length of an optical system including the light sources can be shortened and a size thereof can be reduced.

As illustrated in FIGS. 1 and 2, reflected light beams L1a, L2a, and L3a reflected by reflection surfaces 21, 22, and 23 are incident on second reflection portion 40. Second reflection portion 40 is configured of, for example, an anamorphic-shaped total reflection lens, and condenses light beams separately in the XZ plane and the YZ plane. Second reflection portion 40 is disposed so that a focal plane of the total reflection lens comes near the centers of respective reflection surfaces 21, 22, and 23, and thereby reflected light beams L1b, L2b, and L3b reflected by second reflection portion 40 are collimated. Therefore, reflected light beams L1b, L2b, and L3b reflected by second reflection portion 40 become circular.

As illustrated in FIGS. 1 and 2, reflected light beams L1b, L2b, and L3b reflected by second reflection portion 40 are incident on transmission type diffraction grating 31 provided on emission surface 30.

Figure 5:
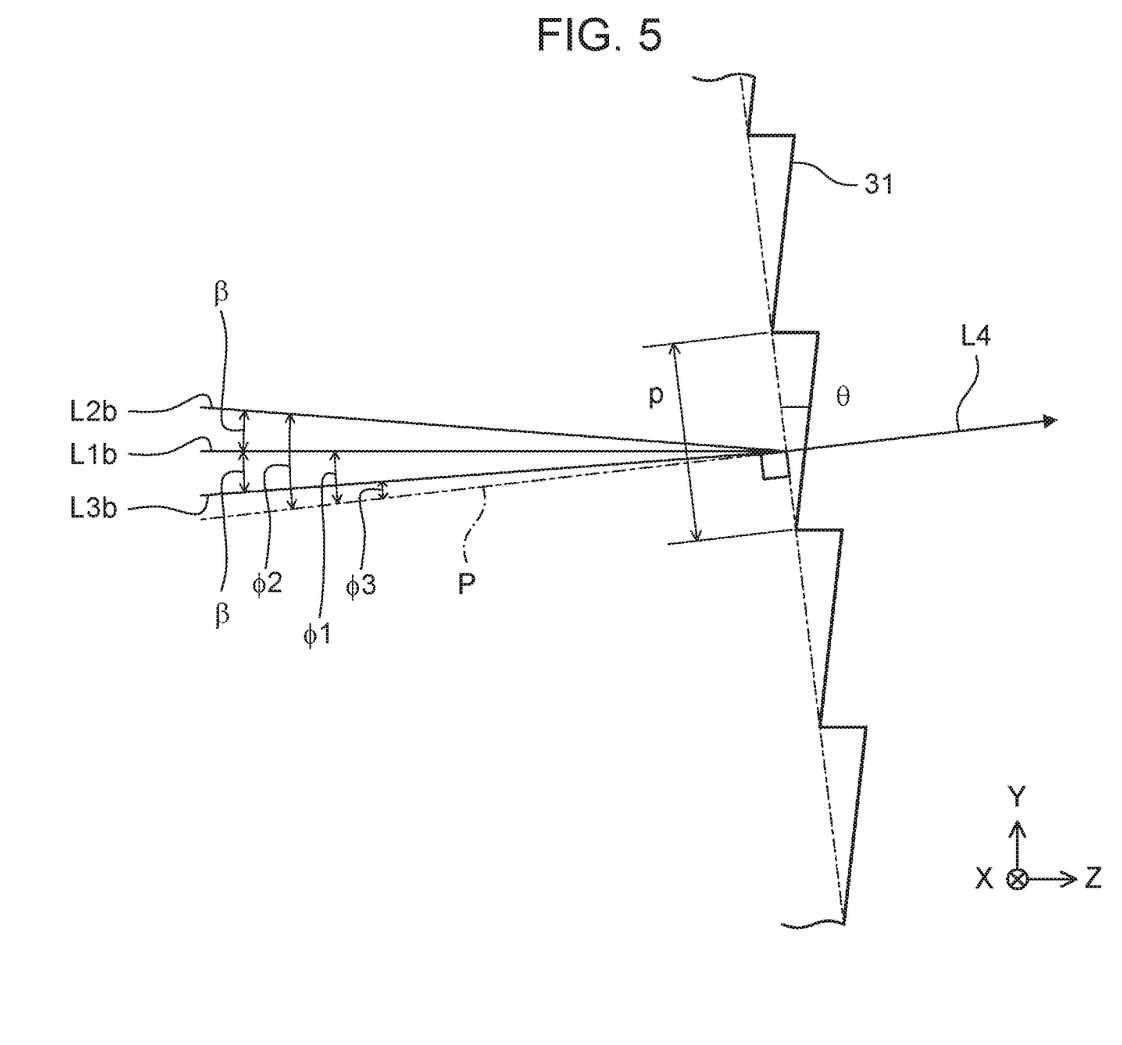
FIG. 5 is an enlarged view of a diffraction grating seen in a direction perpendicular to an X-axis in FIG. 2.

FIG. 5 is an enlarged view of diffraction grating 31 seen in a direction perpendicular to the X-axis in FIG. 2. The grating groove of diffraction grating 31 is a blazed type with inclination angle θ and has a periodic structure with pitch p. Diffraction grating 31 is disposed so that a grating groove direction is parallel to the YZ plane, and surface normal P forms an angle with the Z-axis in the XZ plane.

As illustrated in FIG. 5, since reflected light beams L1b, L2b, and L3b reflected by second reflection portion 40 are parallel light beams, reflected light beam L2b is incident on diffraction grating 31 at angle β formed by reflected light beam L1b and reflected light beam L2b, which is the same as angle β illustrated in FIG. 4. Similarly, reflected light beam L3b is incident on diffraction grating 31 at angle β formed by reflected light beam L1b and reflected light beam L3b, which is the same angle as angle β illustrated in FIG. 4. Diffraction grating 31 is disposed so that when reflected light beams L1b, L2b, and L3b are diffracted by diffraction grating 31 to be emitted, primary diffracted light beam L4 is perpendicular to the grating surface of diffraction grating 31.

Specifically, when the diffraction angles of reflected light beams L1b, L2b, and L3b are respectively φ1, φ2, and φ3, wavelengths of the incident light beams L1, L2, and L3 are respectively λ1, λ2, and λ3, and a refractive index of optical multiplexer 1 is set to n, diffraction grating 31 is disposed so as to satisfy the following equations (1), (2), and (3). The diffraction angle is the angle of the incident light beam with respect to surface normal P of diffraction grating 31.

$$\varphi 1 = a\sin(n \times \lambda 1/p) \qquad \text{Equation (1)}$$

$$\varphi 2 = a\sin(n \times \lambda 2/p) \qquad \text{Equation (2)}$$

$$\varphi 3 = a\sin(n \times \lambda 3/p) \qquad \text{Equation (3)}$$

Here, in a case where a grating groove depth of diffraction grating 31 is optimized so that the diffraction efficiency (hereinafter, simply referred to as "primary diffraction efficiency") of the primary diffracted light beam with respect to reflected light beam L1b having wavelength λ1 is maximized, the primary diffraction efficiency for reflected light beams L2b and L3b having wavelengths λ2 and λ3 is lower than the primary diffraction efficiency for reflected light beam L1b.

As illustrated in FIG. 5, difference (φ2−φ1) between diffraction angle φ2 and diffraction angle φ1, and difference (φ1−φ3) between diffraction angle φ3 and diffraction angle φ1 are equal to angle β illustrated in FIG. 4. As described with reference to FIG. 4, angle α formed by incident light beams L1 and L2, and L1 and L3 is converted into angle β formed by reflected light beams L1a and L2a, and L1a and L3a by first reflection portion 20 having a light ray angle converting function.

Since angle β is smaller than angle α, difference β (φ2−φ1) between diffraction angles φ2 and φ1, and difference β (φ1−φ3) between diffraction angles φ3 and φ1 are small. Therefore, diffraction angles φ2 and φ3 of reflected light beams L2b and L3b are also small. Since the lower the primary diffraction efficiency is, the smaller diffraction angles φ2 and φ3 are, most of reflected light beams L2b and L3b are also emitted as the primary diffracted light beam in a direction perpendicular to the grating surface of diffraction grating 31. As a result, it is possible to realize optical multiplexer 1 having high primary diffraction efficiency.

Assuming that a distance between first reflection portion 20 (plurality of reflection surfaces 21, 22, and 23) and second reflection portion 40 is D, as illustrated in FIG. 4, distance L between reflection surface 21 and reflection surfaces 22 and 23 is represented by the following equation (4).

$$L = D \times \tan\beta \qquad \text{Equation (4)}$$

Therefore, by reducing L, difference (φ2−φ1) between the diffraction angles of reflected light beams L1b and L2b, and difference (φ1−φ3) between the diffraction angles of reflected light beams L1b and L3b can be further reduced.

As illustrated in FIG. 3B, incident light beams L1, L2, and L3 incident on condenser lenses 11, 12, and 13 are condensed in a line shape with width b in the vicinity of the centers of respective reflection surfaces 21, 22, and 23. However, if width b is reduced, reflection surfaces 21, 22, and 23 may be melted by heat due to energy concentration of incident light beams L1, L2, and L3. Therefore, width b is preferably at least more than or equal to several times a beam diameter in a diffraction limit. For example, when a numerical aperture (NA) of condenser lenses 11, 12, and 13 is 0.3 and wavelength λ is 530 nm (green wavelength), diffraction limit (λ/NA) is 1.77 μm. Therefore, in a case where width b is set to more than or equal to 5 times the diffraction limit, width b is preferably more than or equal to 9 μm.

By setting distance L between reflection surface 21 and reflection surfaces 22 and 23 to L≥2×b, leakage of incident light beams L1, L2, and L3 between adjacent reflection surfaces 21, 22, and 23 can be prevented. For example, when distance D between first reflection portion 20 and second reflection portion 40 is 10 mm, in a case where width b is set to 9 μm, β (φ2−φ1 and φ1−φ3) is approximately 0.1°. In a case where width b is set to 90 μm, β (φ2−φ1 and φ1−φ3) becomes approximately 1°. Therefore, it is preferable that angle β formed by reflected light beams L1a, L2a, and L3a reflected by adjacent reflection surfaces 21, 22, and 23 is typically 2° or less.

As described above, according to the present embodiment, first reflection portion 20 having the light ray angle converting function is disposed between incident surface 10 provided with condenser lenses 11, 12, and 13, and emission surface 30 provided with diffraction grating 31. Therefore, it is possible to realize optical multiplexer 1 which has a high diffraction efficiency and in which the size of the optical system including the light source can be reduced.

First reflection portion 20 is configured of first reflection surface 21, second reflection surface 22, and third reflection surface 23 that are disposed to be inclined with respect to first reflection surface 21 in directions inclined to each other. Therefore, it is possible to realize the light ray angle converting function with a simple configuration.

Incident surface 10, first reflection portion 20, second reflection portion 40, and emission surface 30 are formed on the surface of the same transparent member. Therefore, optical multiplexer 1 can be manufactured by molding. According to this, it is possible to realize optical multiplexer 1 that can be easily mass-produced with low cost.

In the present embodiment, in a case where semiconductor lasers of three primary colors of a light beam of red, green, and blue, are used as a plurality of incident light beams having different wavelengths, emitted light beam L4 of a white light beam obtained by multiplexing the incident light beams of the three primary colors from diffraction grating 31 can be emitted. Therefore, it is possible to obtain the white light beam having a higher color rendering property than that of an LED. It is possible to generate emitted light beams of various colors by changing a light intensity of each wavelength.

In a case where light beams of red, green, and blue wavelengths are used as a plurality of incident light beams having different wavelengths, it is preferable that the incident light beam of the green wavelength is incident on first reflection surface 21, the incident light beam of the red wavelength longer than the green wavelength is incident on second reflection surface 22, and the incident light beam of the blue wavelength shorter than the green wavelength is incident on third reflection surface 23. In this case, it is preferable that the incident light beam of the green wavelength is set in diffraction grating 31 so that the primary diffraction efficiency is maximized.

Modified Example

Figures 6A, 6B:
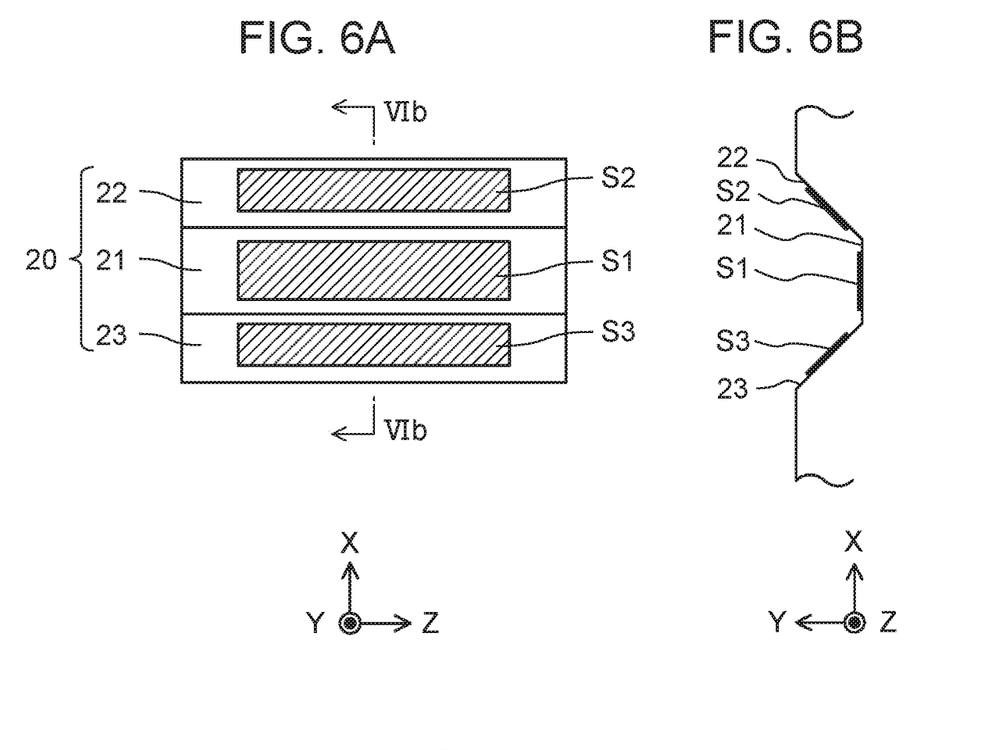
FIG. 6A is a plan view of a first reflection portion according to a modified example of the disclosure.
FIG. 6B is a sectional view taken along line VIb-VIb in FIG. 6A.

In the above-described embodiment, as illustrated in FIGS. 3A and 3B, first reflection portion 20 is formed at a position recessed from the bottom of optical multiplexer 1. However, as illustrated in FIGS. 6A and 6B, first reflection portion 20 may be formed at a position projecting from the bottom of optical multiplexer 1. FIG. 6A is a plan view of first reflection portion 20, and FIG. 6B is a sectional view taken along line VIb-VIb in FIG. 6A.

Similar to the case illustrated in FIGS. 3A and 3B, second reflection surface 22 and third reflection surface 23 are disposed so as to be inclined with respect to first reflection surface 21 in directions inclined to each other.

Figure 7:
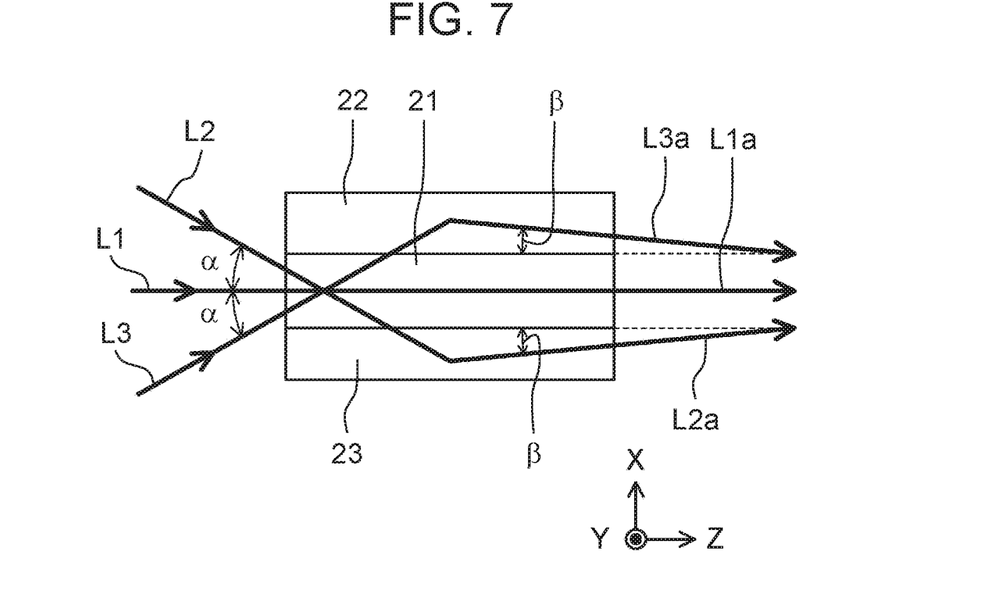
FIG. 7 is a view illustrating a relationship between an incident light beam that incident on the first reflection portion and a reflected light beam that is totally reflected by the first reflection portion.

FIG. 7 is a view illustrating a relationship between incident light beams L1, L2, and L3 incident on reflection surfaces 21, 22, and 23 and reflected light beams L1a, L2a, and L3a totally reflected by reflection surfaces 21, 22, and 23.

As illustrated in FIG. 7, light beam L1 incident on first reflection surface 21 in parallel with the Z-axis is reflected as reflected light beam L1a in parallel with the Z-axis. On the other hand, incident light beam L2 intersects incident light beam L1, is incident on third reflection surface 23 at angle α with respect to the Z-axis, and is reflected as reflected light beam L2a at angle β smaller than angle α with respect to the Z-axis. Similarly, incident light beam L3 intersects incident light beam L1, is incident on second reflection surface 22 at angle α with respect to the Z-axis, and is reflected as reflected light beam L3a at angle β smaller than angle α with respect to the Z-axis. That is, unlike the case illustrated in FIGS. 3A and 3B, incident light beams L2 and L3 are incident on reflection surfaces 23 and 22 on the opposite sides and are reflected.

As described above, also in this modified example, first reflection portion 20 configured of the plurality of reflection surfaces 21, 22, and 23 has a light ray angle converting function.

Other Embodiments

Figure 8:
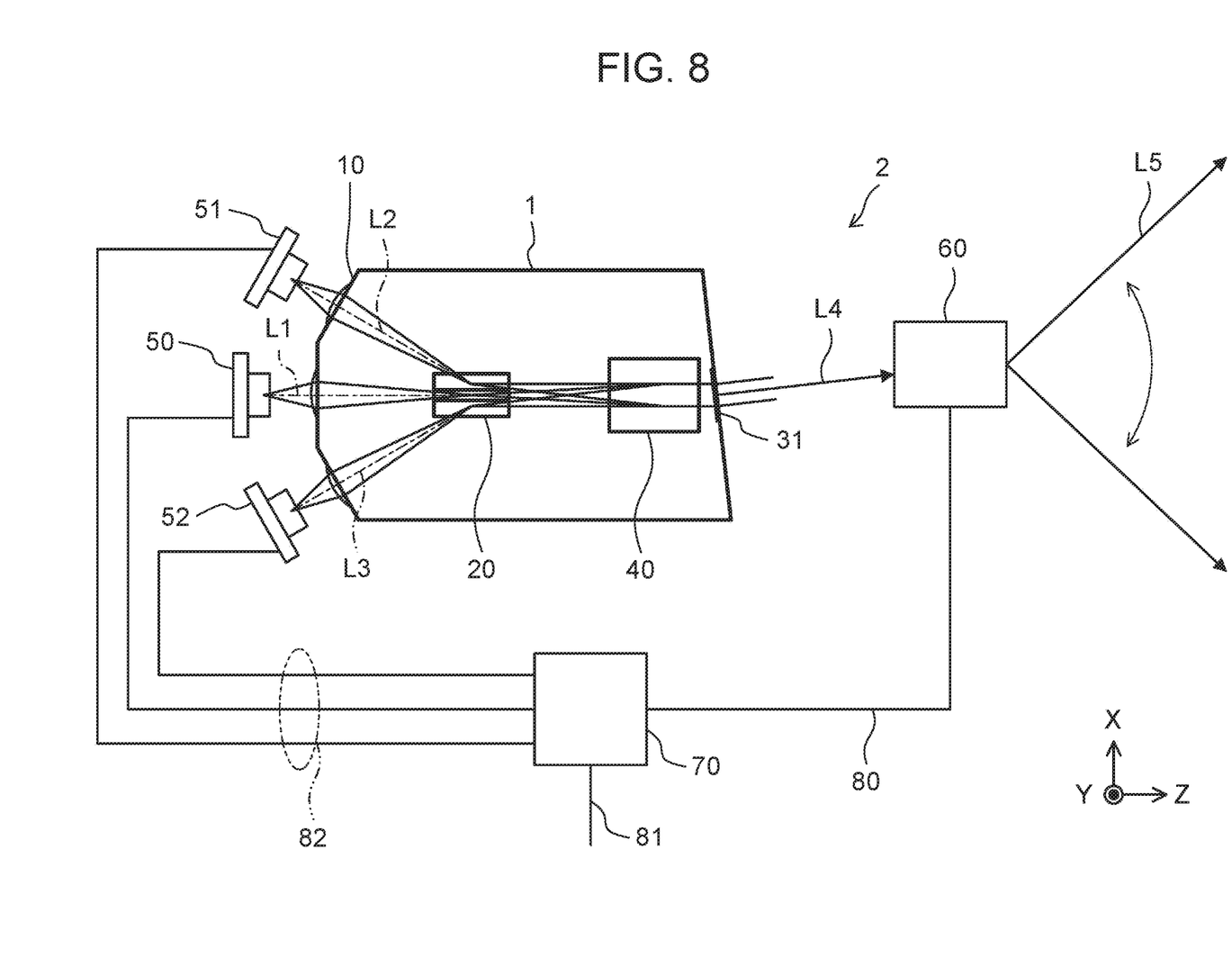
FIG. 8 is a view schematically illustrating an image projection apparatus according to another embodiment of the disclosure.

FIG. 8 is a view schematically illustrating an image projection apparatus configured by using optical multiplexer 1 described in the above embodiment. The description of each component and function of optical multiplexer 1 is omitted.

As illustrated in FIG. 8, image projection apparatus 2 in the present embodiment includes optical multiplexer 1, light sources 50, 51, and 52 allowing a plurality of light beams L1, L2, and L3 having different wavelengths to be incident on optical multiplexer 1, scanner 60 that scans emitted light beam L4 emitted from optical multiplexer 1, and controller 70 that controls the scanning of emitted light beams L1, L2, and L3 in respective light sources 50, 51, and 52, and emitted light beam L4 in scanner 60. Light beams L1, L2, and L3 have wavelengths of red, blue, and green, for example.

Specifically, controller 70 inputs drive signals 82 corresponding to color components of respective wavelengths to respective light sources 50, 51, and 52 in synchronization with video signal 81 input from an outside, and respective light sources 50, 51, and 52 emit light beams L1, L2, and L3 according to drive signals 82. At the same time, controller 70 inputs control signal 80 for controlling the scanning of emitted light beam L4 to scanner 60 in synchronization with video signal 81. Scanner 60 scans emitted light beam L4 in the horizontal direction and the vertical direction according to control signal 80, and projects scanning light beam L5 on a screen (not illustrated). Therefore, a video corresponding to video signal 81 is projected on the screen.

Scanning light beam L5 may be projected on a retina of the human eye instead of being projected on the screen. For example, it may be applied to a head-mounted display that wears eyeglasses on the head of a person and projects scanning light beam L5 on the retina, a head-up display that installs image projection apparatus 2 on a body of an automobile, and reflects scanning light beam L5 with a half mirror to project scanning light beam L5 on the retina, or the like.

Although the disclosure is described above with reference to the preferred embodiments, such description is not a limitation and, of course, various modifications can be made.

For example, in the above-described embodiments, second reflection portion 40 that collimates the plurality of reflected light beams L1a, L2a, and L3a reflected by first reflection portion 20 is provided, but if reflected light beams L1a, L2a, and L3a are close to parallel light beams, second reflection portion 40 does not necessarily have to be provided.

In the above-described embodiments, the incident angles of incident light beams L1, L2, and L3 on respective reflection surfaces 21, 22, and 23 are set so that incident light beams L1, L2, and L3 are totally reflected in first reflection portion 20, but it is not always necessary to perform total reflection. First reflection portion 20 may be a reflection mirror surface on which aluminum or the like is vapor-deposited.

In the above-described embodiments, the examples of the wavelengths of the three primary colors of a light beam are described as the incident light beams having different wavelengths, but the disclosure is not limited to these, and light beams of any different wavelengths may be used. The incident light beams having different wavelengths are not limited to three, and may be any number of more than or equal to two. For example, in the case of two wavelengths, it may be a combination of a visible light beam and an invisible light beam of near infrared or near ultraviolet. Alternatively, a combination of invisible light beams of near infrared and near ultraviolet may be used. Four wavelengths may be used by adding a light beam of an auxiliary color to the light beams of the three primary colors. Therefore, it is possible to expand an expression range of the multiplexed light beam.

In the above-described embodiments, an example in which the semiconductor laser is used as light sources 50, 51, and 52 is described, but the disclosure is not limited to this, and an LED light source may be used, for example. When the LED light source is used, a spectrum width is preferably narrow.

In the above-described embodiments, incident light beam L2 is incident on second reflection surface 22 at same angle α as angle α at which incident light beam L3 is incident on third reflection surface 23, but incident light beam L2 and incident light beam L3 may be incident on second reflection surface 22 and third reflection surface 23 at different angles, respectively.

In the above-described embodiments, incident surface 10, first reflection portion 20, second reflection portion 40, and emission surface 30 are formed on the surface of the same transparent member, but some of them may be formed of separate members.

According to the disclosure, it is possible to provide an optical multiplexer which has a high diffraction efficiency and in which the size of the optical system including the light source can be reduced.

What is claimed is:

1. An optical multiplexer configured to multiplex a plurality of incident light beams having different wavelengths into a light beam and emit the light beam, the optical multiplexer comprising:
   an incident surface on which the plurality of incident light beams are to be incident;
   a reflection portion configured to reflect the plurality of incident light beams incident on the incident surface; and
   an emission surface configured to emit, to an outside, a plurality of reflected light beams reflected by the reflection portion,
   wherein:
   the incident surface is provided with a plurality of adjacent condenser lenses corresponding to the plurality of incident light beams;
   the reflection portion has a plurality of adjacent reflection surfaces configured to respectively reflect the plurality of incident light beams condensed by the plurality of adjacent condenser lenses;
   each of the plurality of adjacent reflection surfaces is disposed so that an angle formed by a reflected light beam reflected by a corresponding one of the plurality of reflected light beams is smaller than an angle formed by an incident light beam condensed by a corresponding one of the plurality of adjacent condenser lenses among the plurality of incident light beams;
   the emission surface is provided with a transmission diffraction grating in which the plurality of reflected light beams reflected by the plurality of adjacent reflection surfaces are to be incident at a same position and diffracted in a same direction;
   the plurality of adjacent reflection surfaces include a first reflection surface, a second reflection surface adjacent to the first reflection surface, and a third reflection surface adjacent to the first reflection surface; and
   the second reflection surface and the third reflection surface are inclined with respect to the first reflection surface in respective directions inclined to each other.

2. The optical multiplexer of claim 1, wherein the incident surface, the reflection portion, and the emission surface are on a surface of a same transparent member.

3. The optical multiplexer of claim 1, wherein:
   the reflection portion is a first reflection portion;
   the optical multiplexer further comprises a second reflection portion configured to collimate and reflect each of the plurality of reflected light beams reflected by the plurality of adjacent reflection surfaces; and
   a plurality of parallel light beams reflected by the second reflection portion are to be incident on the transmission diffraction grating.

4. The optical multiplexer of claim 1, wherein the plurality of adjacent reflection surfaces are configured to totally reflect the plurality of incident light beams incident on the incident surface.

5. The optical multiplexer of claim 1, wherein the angle formed by the reflected light beam reflected by the corresponding one of the plurality of adjacent reflection surfaces among the plurality of reflected light beams is 2 degrees or less.

6. The optical multiplexer of claim 1, wherein the plurality of adjacent condenser lenses are configured to respectively condense the plurality of incident light beams in a line shape on the plurality of adjacent reflection surfaces.

7. The optical multiplexer of claim 1, wherein:
   each of the plurality of incident light beams has a red wavelength, a green wavelength, or a blue wavelength;
   the incident light beams having the green wavelength are to be incident on the first reflection surface;
   the incident light beams having the red wavelength are to be incident on the second reflection surface; and
   the incident light beams having the blue wavelength are to be incident on the third reflection surface.

8. The optical multiplexer of claim 7, wherein, for the incident light beams having the green wavelength, a diffraction efficiency of a primary diffracted light beam is maximized in the transmission diffraction grating.

9. An image projection apparatus comprising:
   the optical multiplexer of claim 1;
   a plurality of light sources configured to emit a plurality of light beams having different wavelengths and allow the plurality of light beams to be incident on the optical multiplexer;
   a scanner for scanning an emitted light beam emitted by multiplexing the plurality of light beams from the optical multiplexer; and
   a controller for controlling the plurality of light beams emitted from the plurality of light sources, and scanning of the emitted light beam in the scanner.

* * * * *